United States Patent
Keselman

(10) Patent No.: US 11,647,020 B2
(45) Date of Patent: May 9, 2023

(54) SATELLITE SERVICE FOR MACHINE AUTHENTICATION IN HYBRID ENVIRONMENTS

(71) Applicant: INTUIT INC., Mountain View, CA (US)

(72) Inventor: Gleb Keselman, Modiin-Maccabim-Reut (IL)

(73) Assignee: INTUIT, INC., Mountain View, CA (US)

( * ) Notice: Subject to any disclaimer, the term of this patent is extended or adjusted under 35 U.S.C. 154(b) by 250 days.

(21) Appl. No.: 16/825,437

(22) Filed: Mar. 20, 2020

(65) Prior Publication Data

US 2021/0297411 A1    Sep. 23, 2021

(51) Int. Cl.
*H04L 9/40* (2022.01)
*H04L 9/32* (2006.01)

(52) U.S. Cl.
CPC ........ *H04L 63/0853* (2013.01); *H04L 9/3247* (2013.01); *H04L 63/083* (2013.01); *H04L 63/10* (2013.01)

(58) Field of Classification Search
CPC .......................... H04L 63/0853; H04L 9/3247
USPC ............................................................ 726/7
See application file for complete search history.

(56) References Cited

U.S. PATENT DOCUMENTS

| | | | |
|---|---|---|---|
| 8,988,715 B2 * | 3/2015 | Tarumi | G06F 3/1205 358/1.15 |
| 2008/0005359 A1 * | 1/2008 | Khosravi | H04L 63/06 709/250 |
| 2016/0154106 A1 * | 6/2016 | Fernandez-Hernandez | G01S 19/215 342/357.42 |

\* cited by examiner

*Primary Examiner* — Anthony D Brown
(74) *Attorney, Agent, or Firm* — Patterson + Sheridan, LLP

(57) ABSTRACT

Certain aspects of the present disclosure provide techniques for access control. Embodiments include receiving, by a satellite component of an access control system, a request from a computing device to verify an identity of the computing device, wherein the request comprises one or more characteristics of the computing device. Embodiments include verifying, by the satellite component, that the one or more characteristics of the computing device are valid, the verifying comprising one or more interactions with a management entity related to the computing device. Embodiments include generating, by the satellite component, a signed document that is trusted by a control component of the access control system. Embodiments include providing, by the satellite component, the signed document to the computing device for use in requesting credentials from the control component to access a secure resource.

20 Claims, 6 Drawing Sheets

SATELLITE SERVICE FOR MACHINE AUTHENTICATION IN HYBRID ENVIRONMENTS

INTRODUCTION

Aspects of the present disclosure relate to techniques for access control in computing environments. In particular, embodiments described herein involve the use of a satellite component of an access control system to confirm validity of characteristics of a computing device to establish trust with an access control component of the access control system.

BACKGROUND

Data security is rapidly becoming a critical, and potentially limiting, factor in the field of data processing. While the emergence of portable data, "cloud computing," and other forms of distributed data processing and data sharing have the potential to provide truly revolutionary and paradigm shifting advances in human activity, current methods of providing security for sensitive data introduce inefficiencies into data access control systems.

For example, many data protection services store application secrets and encryption keys. Data protection services can include a server that runs in a cloud environment and exposes a representational state transfer (REST) application programming interface (API) to client programs running on remote client machines. In some cases, the client machines are themselves virtual machines in the cloud. In order for the client machine to have access to the API, it must possess an authentication credential known as an API credential or API token. Because the API credential may be needed for accessing the data protection service, the API credential is not provided directly from the data protection service to the client machine. Typically, API credentials are provided manually, for example in an email, from some kind of file handover, or from a data protection service administrator. These methods for providing an API credential can be very inconvenient and can reduce the efficiency of both human and computing resources. Additionally, they can introduce security issues with regards to the way the API credentials are transferred and stored.

An access control system may be used to confirm the identity of client machines, enforce access control policies, and provide credentials such as API credentials to client machines. While such a system may be effective within a given network, such as within a single data center, certain problems arise when client machines are located on networks that are separate from the network on which the access control system is located. For example, the access control system may not have access to a management entity of a network on which a client system is located, and so may be unable to verify the identity and characteristics of the client machine. As such, the possibility exists that characteristics of authorized client machines may be "spoofed" by unauthorized entities in order to inappropriately gain access to secure resources from the access control system.

What is needed is a technical solution to the technical problem of efficiently providing secure access to sensitive data across multiple networks.

BRIEF SUMMARY

Certain embodiments provide a method for distributed access control. The method generally includes: receiving, by a satellite component of an access control system, a request from a computing device to verify an identity of the computing device, wherein the request comprises one or more characteristics of the computing device; verifying, by the satellite component, that the one or more characteristics of the computing device are valid, the verifying comprising one or more interactions with a management entity related to the computing device; generating, by the satellite component, a signed document that is trusted by a control component of the access control system; and providing, by the satellite component, the signed document to the computing device for use in requesting credentials from the control component to access a secure resource.

Other embodiments provide a non-transitory computer-readable medium comprising instructions that, when executed by one or more processors of a computing system, cause the computing system to perform a method for distributed access control. The method generally includes: receiving, by a control component of an access control system, a request from a computing device to access a secure resource, wherein the request includes a signed document that comprises a signature of a satellite component of the access control system; verifying, by the control component, based on the signature of the satellite component, that one or more characteristics of the computing device are valid; receiving, by the control component, one or more policies related to the secure resource; confirming, by the control component, that the one or more characteristics of the computing device comply with the one or more policies; and providing, by the control component, based on the confirming, credentials to the computing device for accessing the secure resource Other embodiments provide a system comprising one or more processors and a non-transitory computer-readable medium comprising instructions that, when executed by the one or more processors, cause the system to perform a method for distributed access control. The method generally includes: receiving, by a satellite component of an access control system, a request from a computing device to verify an identity of the computing device, wherein the request comprises one or more characteristics of the computing device; verifying, by the satellite component, that the one or more characteristics of the computing device are valid, the verifying comprising one or more interactions with a management entity related to the computing device; generating, by the satellite component, a signed document that is trusted by a control component of the access control system; and providing, by the satellite component, the signed document to the computing device for use in requesting credentials from the control component to access a secure resource.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
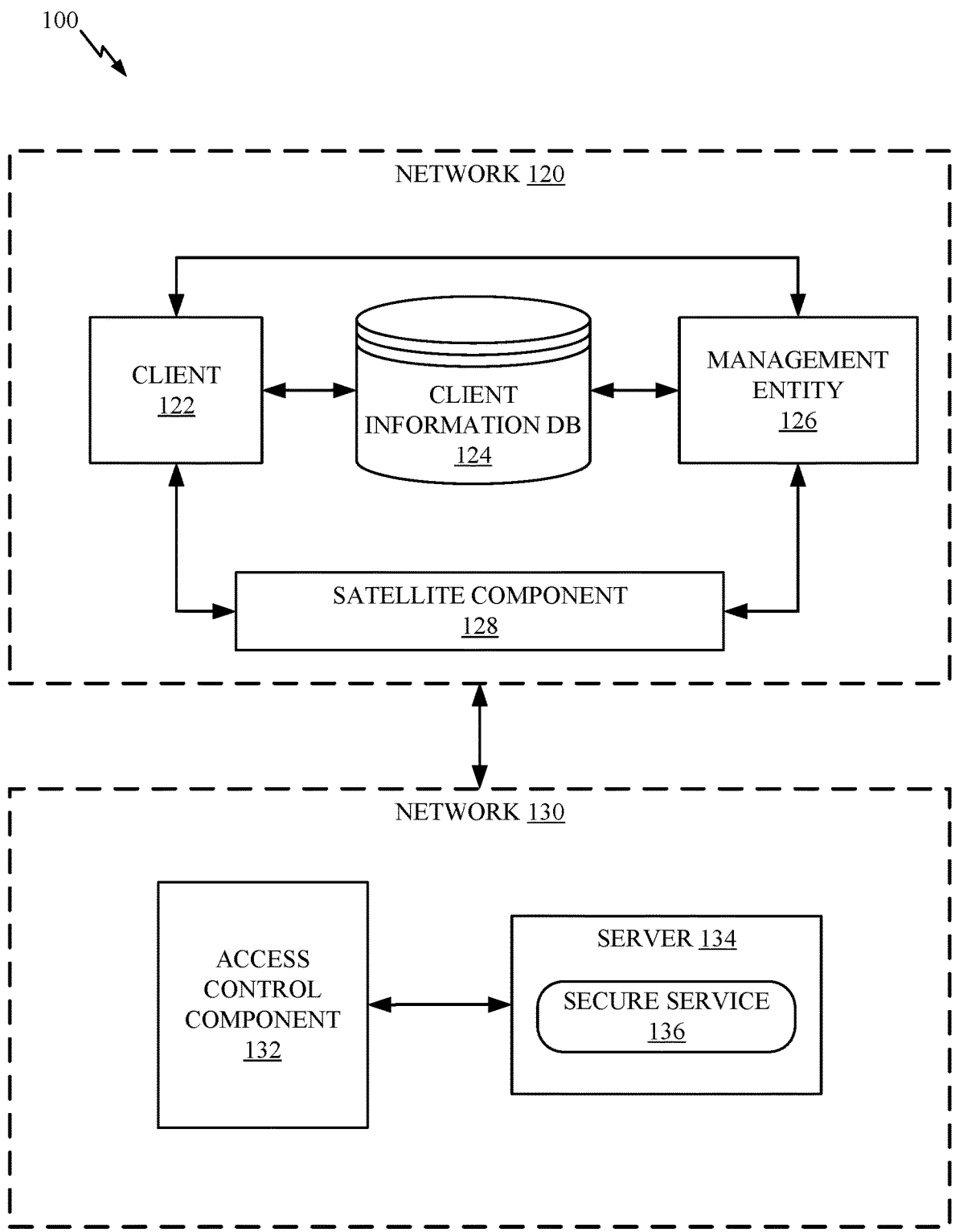
FIG. 1 depicts an example of a distributed access control system for multi-network environments.

Aspects of the present disclosure provide apparatuses, methods, processing systems, and computer readable mediums for distributed access control.

Techniques described herein involve the use of satellite components of an access control system to confirm characteristics of client devices within the networks of the client devices. As used herein, a "satellite component" of an access control system refers to a physical or virtual entity that is separate from an access control component of the access control system, is located within a network in which a client device is located (e.g., which may be a separate network from a network in which the access control component is located), and confirms characteristics of the client device on behalf of the access control system. In an embodiment, a satellite component within a network in which a client device is located receives a request from the client device to confirm characteristics of the client device. The satellite component, being located in the same network as the client device, is able to communicate with a management entity of the network to confirm the characteristics of the client device. A management entity generally refers to one or more physical or virtual computing entities that perform management functions with respect to client devices in a networking environment. In an example, a management entity is a management plane of a data center by which an administrator configures characteristics of client devices in the data center, such as virtual machines, and which pushes configuration data to client devices via a control plane.

Upon confirming the characteristics, the satellite component provides a signed document (e.g., a digital certificate) to the client device affirming validity of the characteristics with a signature that is trusted by the access control system. The client device then uses the signed document from the satellite component to "prove" its characteristics to an access control component of the access control system, which may be located in a different network. In one example, the access control component is located in a cloud computing environment in which a secure resource is located. The client device sends a request to the access control component to access the secure resource, including the signed document in the request. The access control component then applies access control policies for the secure resource to the characteristics of the client device (which the access control component trusts based on the signed document from the satellite component). If the characteristics comply with the policies, the access control component provides credentials for accessing the secure resource to the client device. The credentials may, for example, include an API credential. The client device may then use the credentials to access the secure resource, such as by using an API credential to issue calls to an API provided by the secure resource, which may be a service.

Placing satellite components of the access control system in each network in which client devices are located allows access control for secure resources to be efficiently and reliably enforced across multiple networks. For example, a multi-network environment may include a plurality of cloud and/or on-premise data centers that include physical and/or virtual client devices. Secure resources may include, for example, web services that are accessed by client devices. While conventional techniques may allow an access control system to confirm characteristics of a client device that is located in the same network (e.g., cloud environment or data center) as the access control system, these existing techniques may not provide a mechanism for the access control system to confirm characteristics of client devices located in different networks. Embodiments of the present disclosure solve this problem through the use of a satellite component that is located in the same network as a client device, which may be a different network than a network in which an access control component is located, to confirm characteristics of the client device through interaction with a management component in the network of the client device. As such, unlike previous techniques, embodiments of the present disclosure allow access control to be extended across multiple networks while allowing an access control system to verify characteristics of client devices from the multiple networks.

Example of Distributed Access Control

FIG. 1 illustrates an example 100 of a distributed access control system.

Example 100 includes two networks 120 and 130, each of which represents an independent networking environment, such as a traditional data center computing environment, a virtual asset computing environment (e.g., a cloud computing environment), or a hybrid between a traditional data center computing environment and a virtual asset computing environment, to name just a few examples. Networks 120 and 130 are in data communication with one another, such as via a wide area network (e.g., the Internet).

Network 120 includes a client 122, which represents a physical or virtual computing device from which a user is to access a secure resource in network 130—namely, secure service 136 on server 134 in this example. In certain embodiments, network 120 is a data center and client 122 is a virtual machine that is provisioned and configured by management entity 126 based on input from a user, such as an administrator.

Management entity 126 generally represents a physical or virtual computing entity that performs management functions related to client 122. In one example, management entity 126 represents a management plane of a data center by which an administrator configures characteristics of client devices in the data center, such as virtual machines, and which pushes configuration data to client devices via a control plane. Management entity 126 may, in some embodiments, be implemented as a cluster of servers (e.g., a plurality of servers that together implement the management entity in a distributed manner).

Client information database (DB) 124 is a data storage entity accessible to client 122 and management entity 126. In one embodiment, client information DB 124 is a guest operating system information database established in accordance with a cloud platform managed by management entity 126. Client information DB 124, as it is only accessible by client 122 and management entity 126, may be used as part of a process for verifying characteristics of client 122 by satellite component 128.

Satellite component 128 and access control component 132 are components of a distributed access control system according to embodiments of the present disclosure. In an example, the access control system controls access to secure resources, such as sensitive data and/or services. To access the secure resources, a client must have an access secret, such as an API credential. In traditional access control systems, the API credential is provided to users, client machines, applications, or programs, via a manual handoff. The manual handoff can include an administrator transferring the file to a user, an email including the API credential, storing API credential in a physical memory and providing the physical memory to the user, or in other non-automated ways. Not only are these methods of providing an API credential inconvenient, but they present security risks. For instance, gaining access to the physical memory, the email, a piece of paper on which the API credential is written, or a computer on which the API credential is stored can result in sensitive data being compromised.

The access control system described herein overcomes these drawbacks by enabling the client to obtain an access secret, such as an API credential, directly from an access control system server. The access control system allows the client to obtain an access secret based on characteristics of the client. The characteristics of the client provide evidence that the client machine is authorized to access the secure resource under one or more access policies of the secure resource. For example, a characteristic-based access control system may include policies that restrict access to resources based on characteristics of client devices. Such access control systems may include, for instance, policies that only allow resources to be accessed by client devices from certain networks, belonging to certain groups, having certain network roles, falling within certain IP address ranges, and the like.

In one embodiment, the characteristics of the client can identify the client as a client that should have access to the secure resource. However, because access control component 132 is a separate network 130 from the network 120 in which client 122 is located, access control component 132 may be unable to confirm validity of characteristics provided by client 122 in a request to access the secure resource. As such, satellite component 128 is used to confirm the characteristics of client 122 through interaction with management entity 126 and provide a signed document to client 122 that affirms the validity of the characteristics.

In one example, access control component 132 defines a plurality of access policies. The access policies include a plurality of rules that determine whether a given client is able to access secure service 136.

In one embodiment, secure service 136 is a web service that provides an API. According to embodiments of the present disclosure, client 122 sends a request to satellite component 128 to verify characteristics of client 122. The characteristics may include, for example, an IP address, a unique device identifier, a network identifier, a group, a role, or the like. Satellite component 128 confirms validity of the characteristics through interaction with management entity 126. This overcomes problems associated with conventional techniques, in which an access control system may be in a separate network from the client device, and may therefore not have access to a management entity of the client device in order to verify validity of characteristics of the client device. Management entity 126 knows the characteristics of client devices in network 120, such as client 122, as management entity 126 manages configuration of the client devices. As such, management entity 126 is able to confirm the characteristics.

In some embodiments, in order to ensure that the request is actually coming from client 122 (e.g., as opposed to another entity that may be spoofing characteristics of client 122), satellite component 128 sends a secure token to client 122. The secure token may be a string that is generated by satellite component 128 and shared only with client 122. Client 122 writes the token to client information DB 124. Satellite component 128 then requests management entity 126 to retrieve the token from client information DB 124 in order to confirm that client 122 wrote the token to client information DB 124, which another entity would be unable to do because client information DB 124 is accessible only to management entity 126 and client 122 (e.g., client information D 124 may be a guest operating system information database for client 122 established in accordance with a cloud platform managed by management entity 126). As such, satellite component 128 is able to confirm that the request actually was received by client 122, and is able to receive confirmation of the characteristics of client 122 from management entity 126.

Satellite component 128 generates a signed document affirming the characteristics of client 122, including a signature of satellite component 128 that is trusted by access control component 132, and provides the signed document to client 122.

When client 122 transmits an access request for secure service 136 to access control component 132, client 122 includes the signed document in the access request. In some embodiments, client 122 also includes a policy identification number in the access request. The policy identification number identifies the policy under which client 122 seeks to gain access to secure service 136. Access control component 132 refers to the rules in the access policy indicated by the policy identification number. In some embodiments, access policies have been defined in advance by an administrator.

Access control component 132 compares the characteristics affirmed by the signed document to the rules in the access policy. Access policies may include, for example, rules specifying that given resources can only be accessed by clients having certain characteristics, such as a subnet identification, a private or public IP address, address range, or address pool, whether the client machine corresponds to a given cloud platform, a group within a network, etc.

If the characteristics satisfy the rules in the access policy, then the access control component 132 provides an access secret, such as an API credential for accessing secure service 126, to client 122. Thus, access control component 132 enables client 122 to get access to secured resources protected by the access control system without access control component 132 having access to management entity 126 to confirm the characteristics of client 122.

Example Exchange of Messages Related to Distributed Access Control

Figure 2:
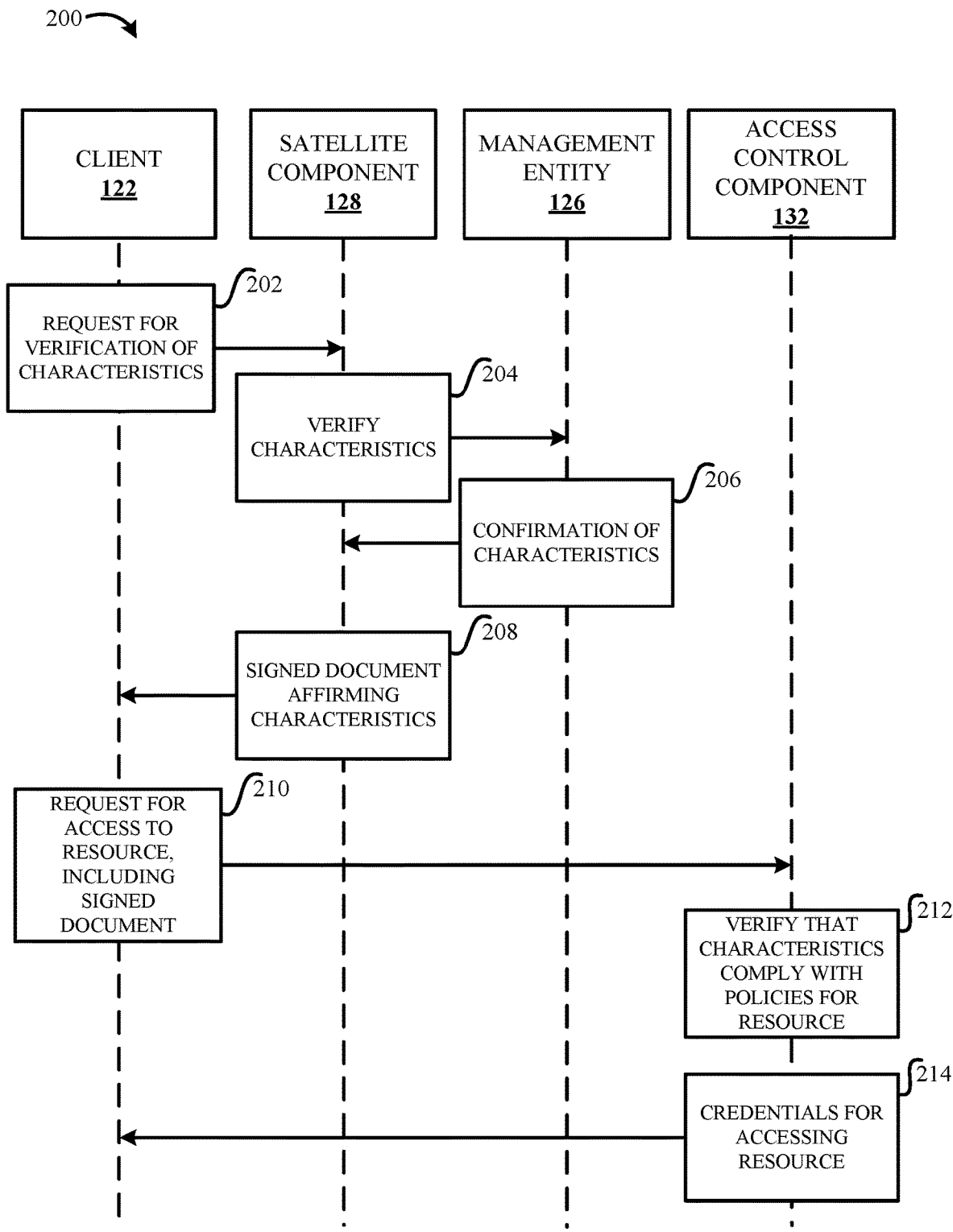
FIG. 2 depicts an example exchange of messages related to distributed access control.

FIG. 2 depicts an example 200 of an exchange of messages related to distributed access control. Example 200 includes client 122, satellite component 128, management entity 126, and access control component 132 of FIG. 1.

At 202, client 122 sends a request for verification of characteristics to satellite component 128. The characteristics include identifying attributes of client 122, such as an IP address.

At 204, satellite component 128 verifies the characteristics through interaction with management entity 126, and management entity 126 confirms the characteristics to satellite component 128 at 206. As described in more detail below with respect to FIG. 3, confirming the characteristics may involve satellite component 128 providing a token to client 122, client 122 writing the token to client information DB 124, and management entity 126 retrieving the token from client information DB 124 and providing the token to satellite component 128 for confirmation. The token may, for instance, be a string (e.g., of random characters) that is generated by satellite component 128 and shared only with client 122. In some embodiments, management entity 126 also confirms that the characteristics provided by satellite component 128 match the characteristics that it stores for client 122.

At 208, satellite component 128 provides a signed document to client 122 affirming validity of the characteristics. In some embodiments, the signed document includes a list of the characteristics and a signature of satellite component 128 that is trusted by access control component 132.

At 210, client 122 sends a request for access to a resource to access control component 132, including the signed document in the request. The resource may be, for example, secure data or a secure service, and the request may also, in some embodiments, include a policy identifier of a policy under which client 122 is authorized to access the resource.

At 212, access control component 132 verifies that the characteristics affirmed by the signed document comply with one or more access policies for the resource. In some embodiments, the one or more access policies are identified in the request sent at 210. In one embodiment, access policy rules include an expected public IP address range associated with the client and/or an expected universal unique identifier for the client. The access policy rules can dictate that credentials (e.g., an access secret) can only be provided to a requesting client under that policy if the client has a public IP address within the expected range and/or has the universal unique identifier listed in the access policy rules.

In one embodiment, network 120 and/or network 130 includes roles to which client machines, programs, and/or applications can belong, as well as private clouds, sub-clouds, subnets, etc. for use by systems, organizations, individuals, etc. Public IP addresses and private IP addresses can be associated with the various roles, groups, private clouds, sub-clouds, subnets, organizations, systems, etc. Each client can include a universal unique identifier. All of these various services and characteristics associated with network 120 and/or network 130 can be used as characteristics that identify client machines and their relationships with platform service providers. The client characteristics can include data identifying these data points.

In one embodiment, the access policy rules associated with a particular access policy can include particular relationships or credentials that a client has with a public or private cloud service provider. For example, the access policy rules can include that a client must be associated with a certain universal unique identifier, certain role, a certain sub-cloud, a certain private cloud, a certain subnet, a certain group, a certain public IP address or public IP address block, a certain private IP address or private IP address block, or other features.

In one embodiment, the characteristics include data that indicates that the client is associated with a particular role, a particular group, a particular sub-cloud, a particular private cloud, a particular subnet, a particular public IP address or private IP address block, a particular private IP address or private IP address block, etc. The characteristics can also include other types of data not listed here that identify the characteristics of a client and that can be used in ascertaining the characteristics or credentials of the client for the purpose of determining whether the client satisfies a particular access policy of the access control system.

At 214, access control component 132 provides credentials for accessing the resource to client 122. The credentials may, for instance, be an API credential. Access control component 132 may generate credentials for accessing resources. In one embodiment, access control component 132 generates an API credential and sends it to client 122 and to the resource, which may be a secure service. As such, client 122 can then submit requests to an API provided by the secure service using the API credential, and the secure service will recognize the API credential and grant access. It is noted that these are only included as examples of access policies, characteristics, credentials, and resources, and techniques described herein for distributed access control may be employed in different types of environments and circumstances.

Example Embodiment of Identity Verification

Figure 3:
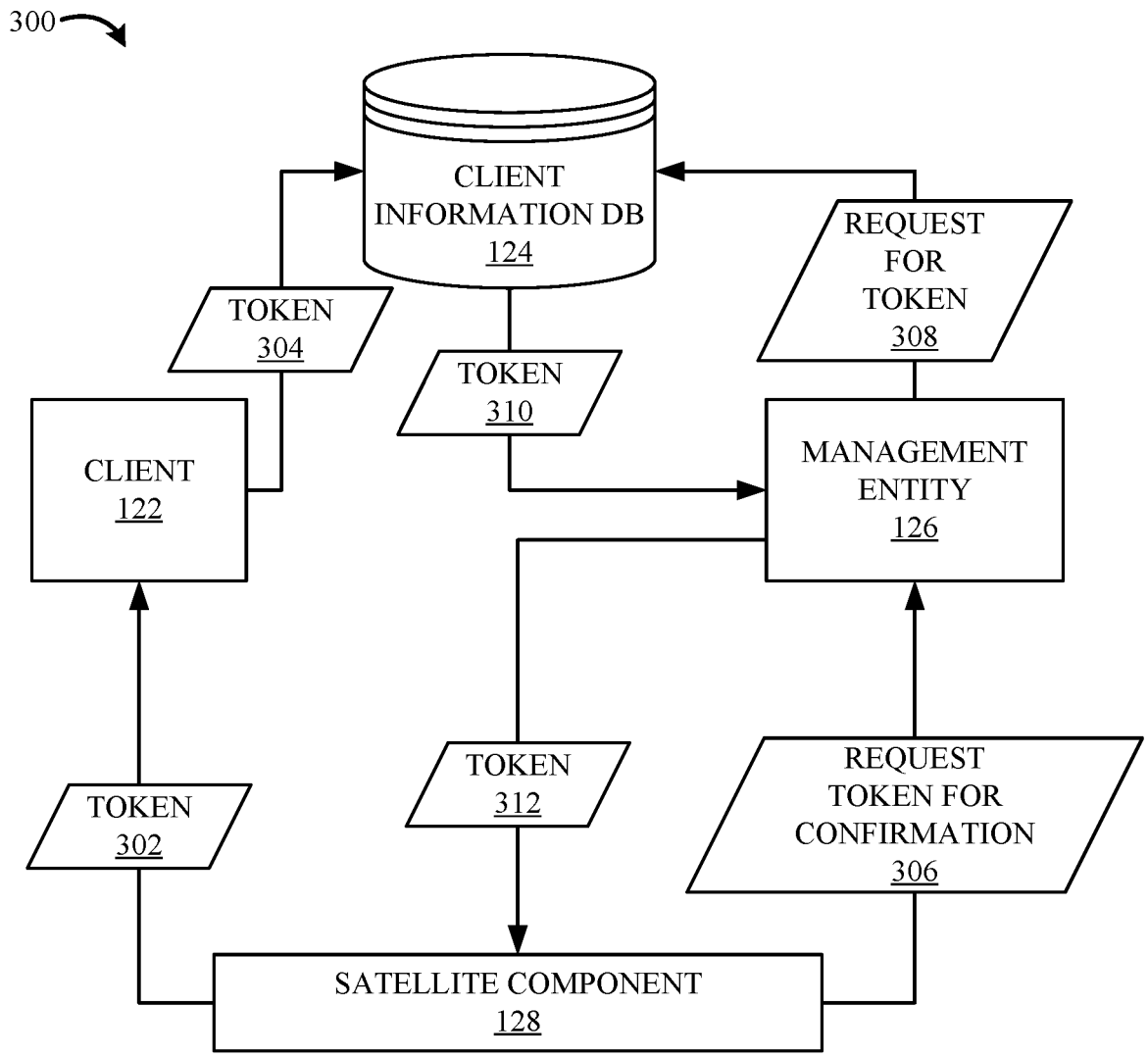
FIG. 3 depicts an example of identity verification for distributed access control.

FIG. 3 depicts example 300 of identity verification for distributed access control.

Example 300 includes client 122, client information DB 124, management entity 126, and satellite component 128 of FIG. 1. Example 300 may be performed, for example, after client 122 sends a request to satellite component 128 to verify characteristics of client 122 (e.g., after step 202 in example 200 of FIG. 2).

At 302, satellite component 128 sends a token to client 122. In some embodiments, the token is a unique string generated by satellite component 128 and shared only with client 122.

At 304, client 122 sends token 204 to client information DB 124 for storage. Because only client 122 and management entity 126 have access to client information DB 124, satellite component 128 can confirm that client 122 is indeed to system it claims to be by requesting management entity 126 to retrieve the token from client information DB 124, and ensuring that the token retrieved by management entity 126 matches the token sent to client 122.

As such, at 306, satellite component 128 sends a request for the token for confirmation to management entity 126. At 308, management entity 126 requests the token from client information DB 124. At 310, management entity 126 receives the token from client information DB 124, and at 312, management entity 126 provides the token to satellite component 128.

Satellite component 128 then compares the token received at 312 from management entity 126 to the token sent to client 122 at 302 to ensure that the tokens match. If the tokens match, then satellite component has confirmed the identity of client 122. If the tokens do not match, or if management entity 126 is unable to retrieve the token from client information DB 124, then satellite component 128 is unable to confirm the identity of client 122, and may refuse the request to confirm characteristics of client 122.

Example Operations for Distributed Access Control

Figure 4:
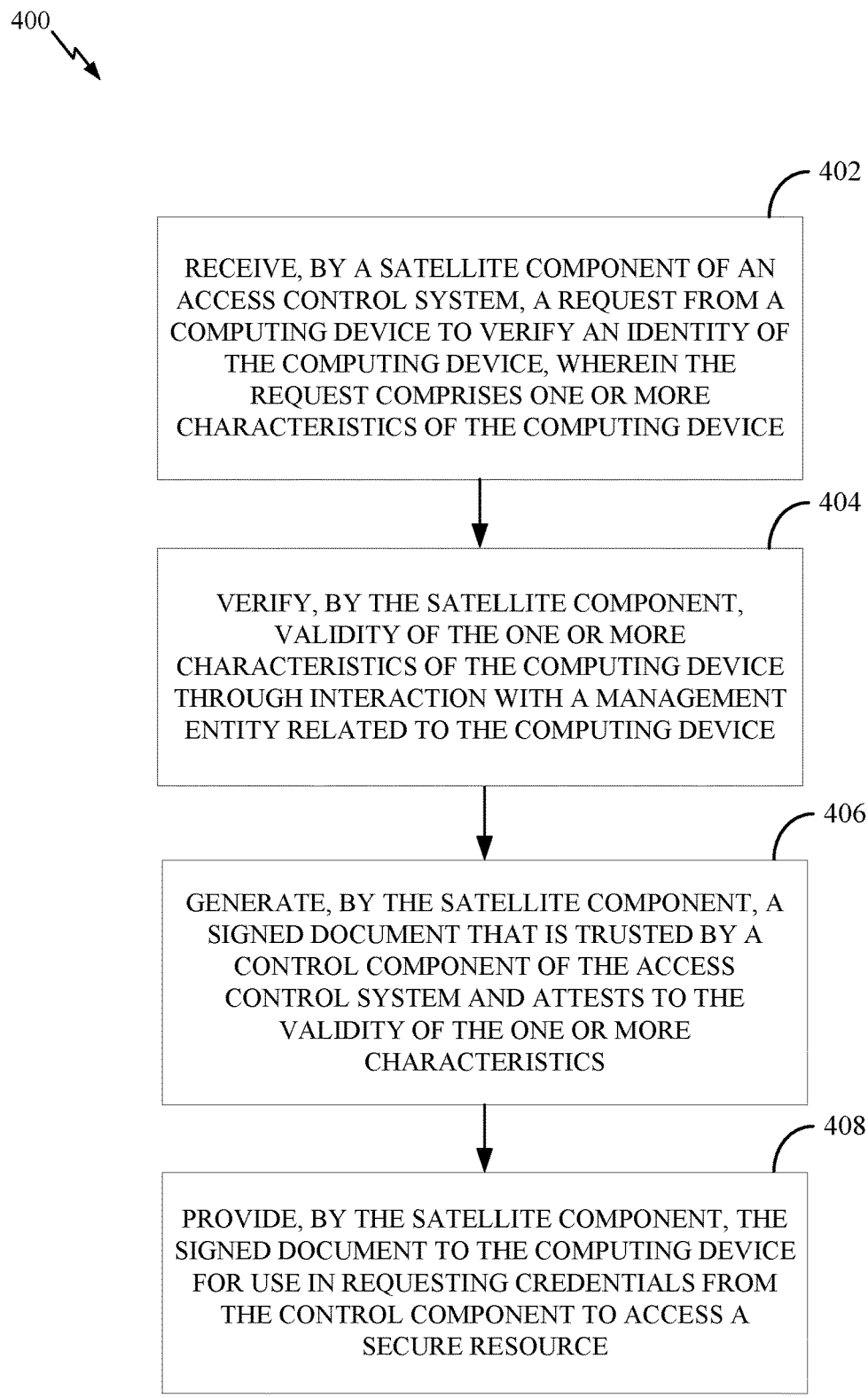
FIG. 4 depicts example operations for distributed access control.

FIG. 4 depicts example operations 400 for distributed access control. For example, operations 400 may be performed by satellite component 128 of FIG. 1.

Operations 400 begin at step 402, where a satellite component of an access control system receives a request from a computing device to verify an identity of the computing device, wherein the request comprises one or more characteristics of the computing device. In an example, satellite component 128 of FIG. 1 receives the request from client 122 of FIG. 1.

At step 404, the satellite component verifies validity of the one or more characteristics of the computing device through interaction with a management entity related to the computing device. For example, satellite component 128 of FIG. 1 may interact with management entity 126 of FIG. 1 to confirm the validity of the characteristics.

At step 406, the satellite component generates a signed document that is trusted by a control component of the access control system and attests to the validity of the one or more characteristics. The signed document may include, for example, a signed digital certificate indicating that the trusted authority (the satellite component) affirms the validity of the characteristics. In an embodiment, satellite component 128 of FIG. 1 generates the signed document that is trusted by access control component 132 of FIG. 1.

At step 408, the satellite component provides the signed document to the computing device for use in requesting credentials from the control component to access a secure resource from the control component. In an embodiment, satellite component 128 of FIG. 1 provides the signed document generated at step 408 to client 122 of FIG. 1.

In some embodiments, verifying the validity of the one or more characteristics of the computing device through interaction with the management entity related to the computing device comprises providing a secure token to the computing device and receiving a confirmation from the management entity that the computing device stored the secure token in a data store accessible by the computing device and the management entity.

In certain embodiments, verifying the validity of the one or more characteristics of the computing device through interaction with the management entity related to the computing device further comprises receiving an indication of the one or more characteristics from the management entity.

In some embodiments, the one or more characteristics of the computing device comprise one or more of: an internet protocol (IP) address; a network identifier; a group identifier; or a role.

In certain embodiments, the management entity corresponds to a platform service provider of the computing device, and the satellite component interacts with the management entity via an application programming interface (API) provided by the platform service provider. The platform service provider may, for instance, be a provider of a cloud environment or data center.

In some embodiments, the satellite component, the computing device, and the management entity are located in a first networking environment, and the control component is located in a second networking environment that is separate from the first networking environment. Each of the first networking environment and the second networking environment may be, for example, a data center, a cloud computing environment, a dedicated hosting environment, or another type of computing environment.

In certain embodiments, the signed document comprises a list of the one or more characteristics and a signature that is shared between the satellite component and the control component.

Figure 5:
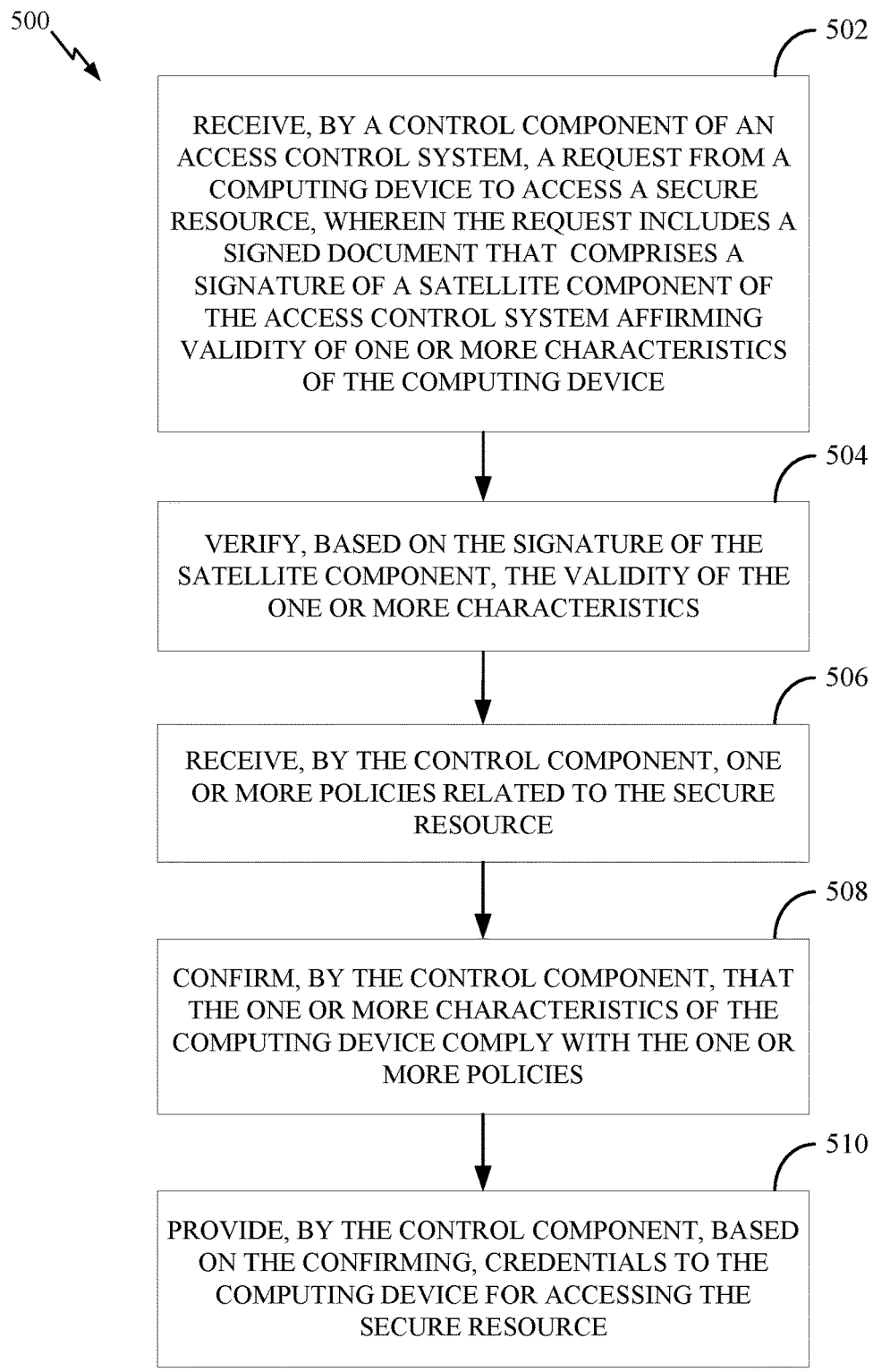
FIG. 5 depicts additional example operations for distributed access control.

FIG. 5 depicts additional example operations 500 for distributed resource control. For example, operations 500 may be performed by access control component 132 on FIG. 1.

At step 502, a control component of an access control system receives a request from a computing device to access a secure resource, wherein the request includes a signed document that comprises a signature of a satellite component of the access control system affirming validity of one or more characteristics of the computing device.

At step 504, the control component verifies, based on the signature of the satellite component, the validity of the one or more characteristics.

At step 506, the control component receives one or more policies related to the secure resource.

At step 508, the control component confirms that the one or more characteristics of the computing device comply with the one or more policies.

At step 510, the control component provides, based on the confirming, credentials to the computing device for accessing the secure resource.

In some embodiments, the satellite component and the computing device are located in a first networking environment, and the control component is located in a second networking environment that is separate from the first networking environment.

In certain embodiments, the satellite component has verified the validity of the one or more characteristics of the computing device through interaction with a management entity related to the computing device.

In some embodiments, the management entity corresponds to a platform service provider of the computing device, and the satellite component interacts with the management entity via an application programming interface (API) provided by the platform service provider.

In certain embodiments, the one or more characteristics of the computing device comprise one or more of: an internet protocol (IP) address; a network identifier; a group identifier; or a role.

In some embodiments, the signed document comprises a list of the one or more characteristics.

Example Computing Systems for Distributed Access Control

Figure 6A:
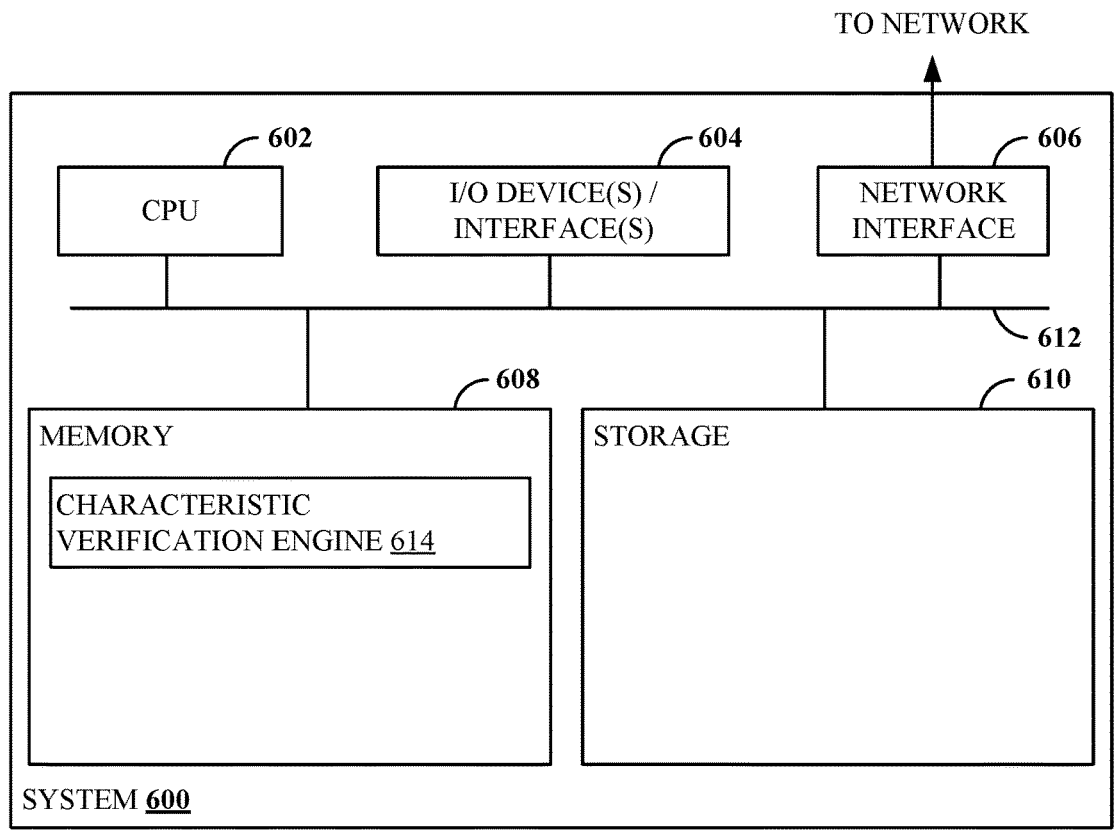
FIGS. 6A and 6B depict example computer systems with which embodiments of the present disclosure may be implemented.

FIG. 6A illustrates an example system 600 used for distributed access control. For example, system 600 may be representative of satellite component 128 of FIG. 1.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements. Additionally, the memory 608 is included to be representative of a volatile working memory, such as a random access memory.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes characteristic verification engine 614, which performs operations related to verifying characteristics of client devices for distributed access control. For example, characteristic verification engine may perform operations 400 of FIG. 4.

Figure 6B:
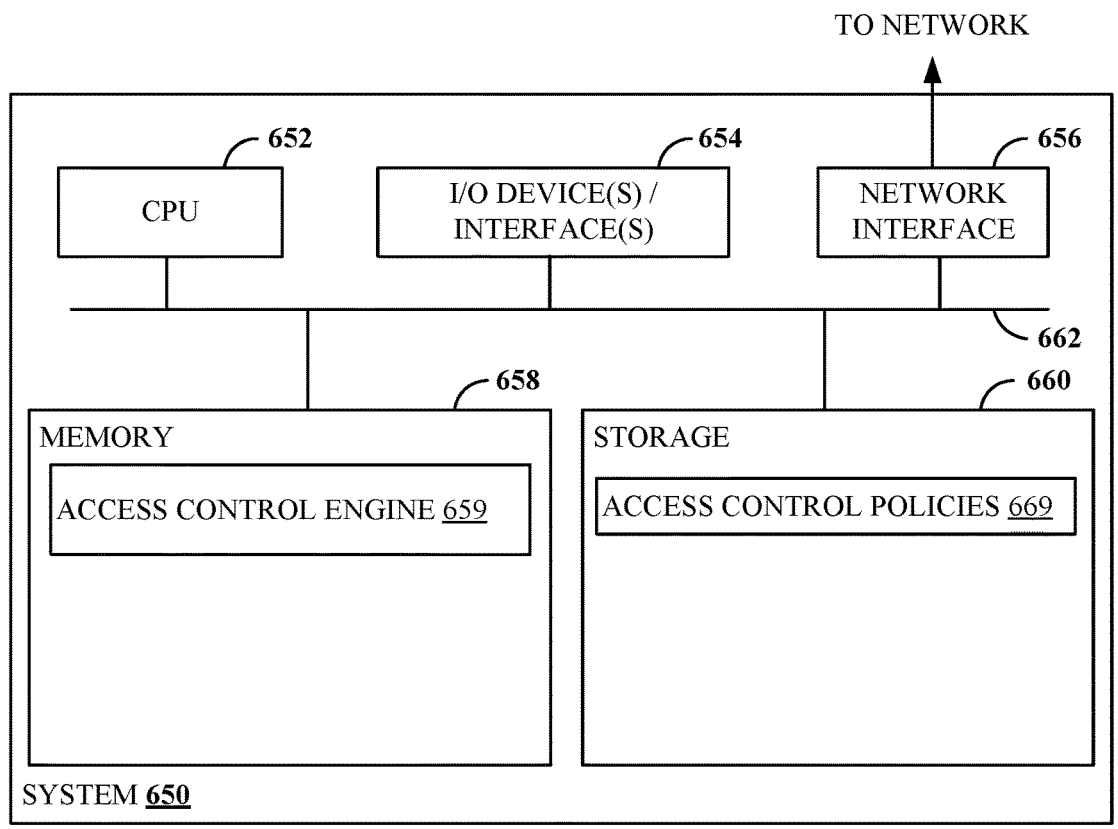

FIG. 6B illustrates an example system 650 used for distributed access control. For example, system 650 may be representative of access control component 132 of FIG. 1.

System 650 includes a central processing unit (CPU) 652, one or more I/O device interfaces 654 that may allow for the connection of various I/O devices 654 (e.g., keyboards, displays, mouse devices, pen input, etc.) to the system 650, network interface 656, a memory 658, storage 660, and an interconnect 662. It is contemplated that one or more components of system 650 may be located remotely and accessed via a network. It is further contemplated that one or more components of system 650 may comprise physical components or virtualized components.

CPU 652 may retrieve and execute programming instructions stored in the memory 658. Similarly, the CPU 652 may retrieve and store application data residing in the memory 658. The interconnect 662 transmits programming instructions and application data, among the CPU 652, I/O device interface 654, network interface 656, memory 658, and storage 660. CPU 652 is included to be representative of a single CPU, multiple CPUs, a single CPU having multiple processing cores, and other arrangements. Additionally, the memory 658 is included to be representative of a random access memory.

Storage 660 may be a disk drive, solid state drive, or a collection of storage devices distributed across multiple storage systems. Although shown as a single unit, the storage 660 may be a combination of fixed and/or removable storage devices, such as fixed disc drives, removable memory cards or optical storage, network attached storage (NAS), or a storage area-network (SAN).

As shown, memory 658 includes access control engine 659, which performs operations related to distributed access control. For example, characteristic verification engine may perform operations 500 of FIG. 5.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for distributed access control, comprising:
    receiving, by a satellite component of an access control system, a request from a computing device to verify an identity of the computing device, wherein the request comprises one or more characteristics of the computing device, and wherein the satellite component runs on one or more processors;
    verifying, by the satellite component, that the one or more characteristics of the computing device are valid, the verifying comprising one or more interactions with a management entity related to the computing device, wherein the satellite component is different from the management entity;
    generating, by the satellite component, a signed document that is trusted by a control component of the access control system; and
    providing, by the satellite component, the signed document to the computing device for use in requesting credentials from the control component to access a secure resource, wherein:
        the satellite component, the computing device, and the management entity are located in a first networking environment; and
        the control component and the secure resource are located in a second networking environment that is separate from the first networking environment.

2. The method of claim 1, wherein verifying, by the satellite component, that the one or more characteristics of the computing device are valid comprises:

providing a secure token to the computing device; and
receiving a confirmation from the management entity that the computing device stored the secure token in a data store accessible by the computing device and the management entity.

3. The method of claim 2, wherein verifying, by the satellite component, that the one or more characteristics of the computing device are valid further comprises receiving an indication of the one or more characteristics from the management entity.

4. The method of claim 1, wherein the one or more characteristics of the computing device comprise one or more of:
an internet protocol (IP) address;
a network identifier;
a group identifier; or
a role.

5. The method of claim 1, wherein the management entity corresponds to a platform service provider of the computing device, and wherein the satellite component interacts with the management entity via an application programming interface (API) provided by the platform service provider.

6. The method of claim 1, wherein the signed document comprises a list of the one or more characteristics and a signature that is shared between the satellite component and the control component.

7. A method for distributed access control, comprising:
receiving, by a control component of an access control system, a request from a computing device to access a secure resource, wherein the request includes a signed document that comprises a signature of a satellite component of the access control system, and wherein the control component runs on one or more processors;
verifying, by the control component, based on the signature of the satellite component, that one or more characteristics of the computing device are valid, wherein the signature of the satellite component is generated based on one or more interactions with a management entity related to the computing device, and wherein the satellite component is different from the management entity;
receiving, by the control component, one or more policies related to the secure resource;
confirming, by the control component, that the one or more characteristics of the computing device comply with the one or more policies; and
providing, by the control component, based on the confirming, credentials to the computing device for accessing the secure resource, wherein:
the satellite component, the computing device, and the management entity are located in a first networking environment; and
the control component and the secure resource are located in a second networking environment that is separate from the first networking environment.

8. The method of claim 7, wherein the satellite component has verified that the one or more characteristics of the computing device are valid through the one or more interactions with the management entity.

9. The method of claim 7, wherein the management entity corresponds to a platform service provider of the computing device, and wherein the satellite component interacts with the management entity via an application programming interface (API) provided by the platform service provider.

10. The method of claim 7, wherein the one or more characteristics of the computing device comprise one or more of:
an internet protocol (IP) address;
a network identifier;
a group identifier; or
a role.

11. The method of claim 7, wherein the signed document comprises a list of the one or more characteristics.

12. A system, comprising one or more processors and a memory comprising instructions that, when executed by the one or more processors, cause the system to:
receive, by a satellite component of an access control system, a request from a computing device to verify an identity of the computing device, wherein the request comprises one or more characteristics of the computing device;
verify, by the satellite component, that the one or more characteristics of the computing device are valid, the verifying comprising one or more interactions with a management entity related to the computing device, wherein the satellite component is different from the management entity;
generate, by the satellite component, a signed document that is trusted by a control component of the access control system; and
provide, by the satellite component, the signed document to the computing device for use in requesting credentials from the control component to access a secure resource, wherein:
the satellite component, the computing device, and the management entity are located in a first networking environment; and
the control component and the secure resource are located in a second networking environment that is separate from the first networking environment.

13. The system of claim 12, wherein verifying, by the satellite component, that the one or more characteristics of the computing device are valid comprises:
providing a secure token to the computing device; and
receiving a confirmation from the management entity that the computing device stored the secure token in a data store accessible by the computing device and the management entity.

14. The system of claim 13, wherein verifying, by the satellite component, that the one or more characteristics of the computing device are valid further comprises receiving an indication of the one or more characteristics from the management entity.

15. The system of claim 12, wherein the one or more characteristics of the computing device comprise one or more of:
an internet protocol (IP) address;
a network identifier;
a group identifier; or
a role.

16. The system of claim 12, wherein the management entity corresponds to a platform service provider of the computing device, and wherein the satellite component interacts with the management entity via an application programming interface (API) provided by the platform service provider.

17. The system of claim 12, wherein the signed document comprises a list of the one or more characteristics and a signature that is shared between the satellite component and the control component.

18. The method of claim 1, wherein the control component is unable to access the management entity.

19. The method of claim 7, wherein the control component is unable to access the management entity.

20. The system of claim 12, wherein the control component is unable to access the management entity.

\* \* \* \* \*